July 31, 1956 R. L. HUGHES 2,757,302

COLOR TELEVISION SCREEN

Filed Nov. 26, 1951

Ralph L. Hughes
INVENTOR.

United States Patent Office 2,757,302

Patented July 31, 1956

2,757,302

COLOR TELEVISION SCREEN

Ralph Lewton Hughes, Los Angeles, Calif.

Application November 26, 1951, Serial No. 258,106

8 Claims. (Cl. 313—70)

This invention relates to colored television and has for its object to provide a novel means for showing the television pictures in their natural colors when seen on the picture screen of a television receiving set. This is accomplished by the use of only one cathode-ray picture tube and a specially designed stationary color blending picture screen which produces a picture image in natural color.

Either simultaneous color or sequential color television transmission systems may be used with this novel color screen and the objectionable features of the three-tube simultaneous system and the revolving filter sequential color system are eliminated since only one cathode-ray picture tube is necessary and the color screen has no mechanical movement in its operation.

With the elimination of these objectionable features from the transmission and reception of colored television pictures and the use of this new simplified method of colored television reception the way will be cleared for inexpensive colored television receiving sets being placed in the homes throughout America.

More specific objects and features of this invention will become apparent from the following description when considered in connection with the accompanying drawings, in which—

Figures 1, 2, 3, 4, 5, 6:
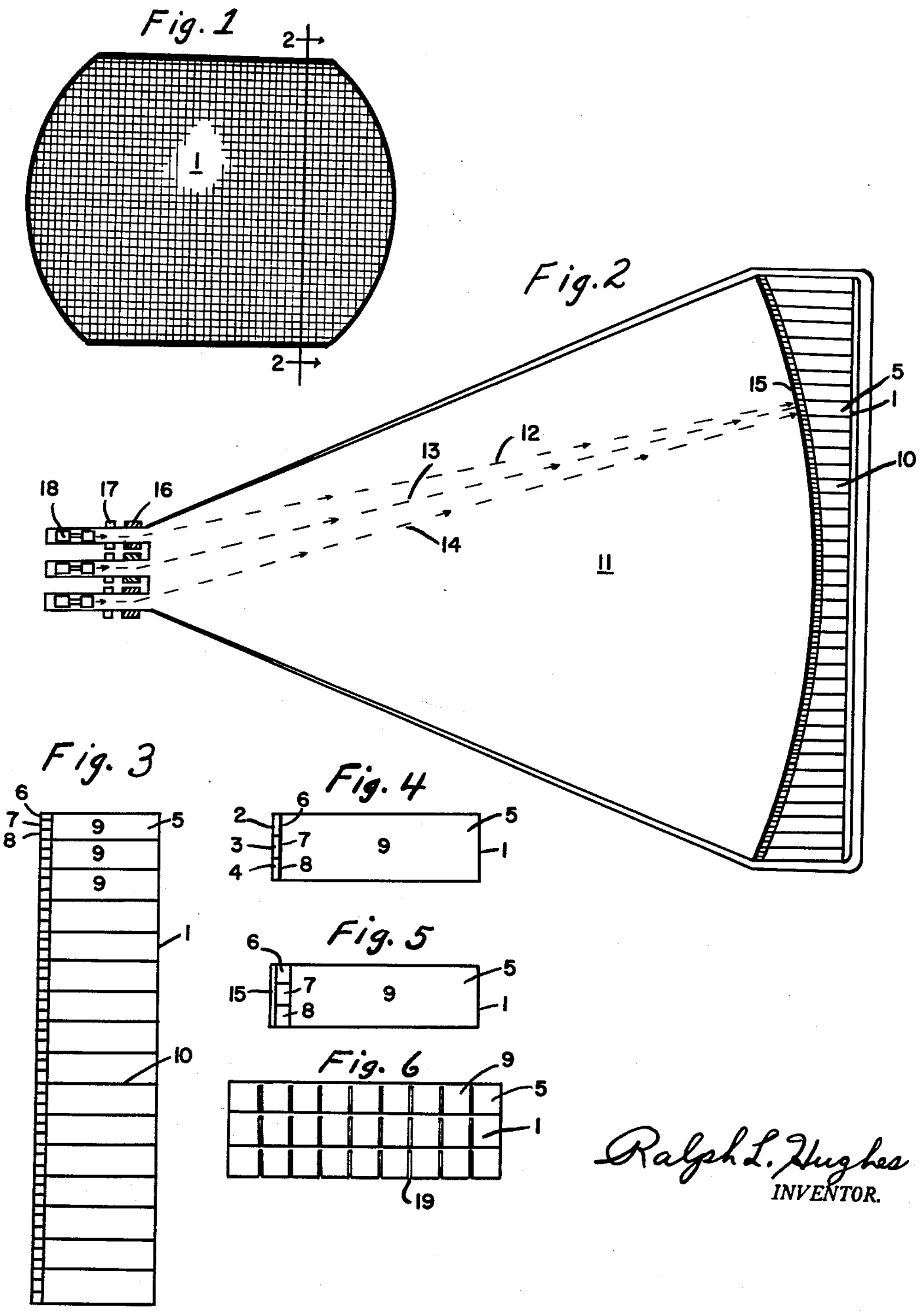
Figure 1 is a front elevational view of a television cathode-ray tube picture screen equipped with a multiple plastic rod color blending screen as embodied in this invention.
Figure 2 is a vertical section taken on line 2—2 of Figure 1, showing location of the plastic rod color screen at the front of a three-cathode picture tube for use with either sequential color or simultaneous color transmission systems.
Figure 3 is an enlarged fragmentary vertical section of the color blending screen showing details and arrangement of a vertical row of rectangular plastic rods of the color blending screen as constructed in accordance with the present invention.
Figure 4 is an enlarged section of one rectangular rod of the multiple plastic rod color blending screen showing the three different color phosphors coating the back of the plastic rod that may be used to produce the various colors.
Figure 5 is an enlarged section of one rectangular rod of a color blending screen in which the light-producing phosphors are coated onto three separate colored transparent plastic ribbons used to produce the various colors.
Figure 6 is a front elevational view of an enlarged fragmentary portion of the viewing screen showing parts of three horizontal plastic segments with their vertical slots which form, in effect, horizontal and vertical rows of rectangular shaped plastic rods which, when reduced to actual size constitute the tiny color units or dots that form the picture image of the viewing screen.

Referring to the drawings more specifically by characters of reference, numeral 1 designates the face of the viewing screen, which is composed of the combined ends of all the rectangular rods of all of the segments and on which the color picture image is seen. In Figure 4 the numerals 2, 3 and 4 each designate the separate and different colored light emitting phosphor coatings that may be used to produce the three different colored ribbons 6, 7 and 8 which in turn form the colors for the natural color picture image produced on the viewing screen 1.

The numeral 5 indicates a rectangular light conductor unit made of a clear transparent plastic rod and is attached, by a thin plastic film, to other rectangular light conductor units to form a complete horizontal picture screen segment 9 as embodied in this invention. Each complete light conductor unit 5 has three separate and distinct color ribbons 6, 7 and 8 located on the edge of the transparent plastic segment strip 9 which is divided horizontally into the separate light conductor units 5 by the horizontal rows of vertical slots 19 which penetrate to nearly the full thickness of the segment strip 9. Each complete segment strip 9 is arranged side by side vertically with the other horizontal segments to form the complete multiple plastic rod color blending screen 10 as shown in Figures 2 and 3, forming horizontal and vertical rows of light conductor elements 5 over the entire surface of the television picture viewing screen 1.

In Figure 2, 11 indicates a three-cathode picture tube with three electron beams 12, 13 and 14, each separate electron beam being directed and focused by deflecting and focusing coils 16 and 17 respectively so as to light up the phosphorescent material of the color ribbons 6, 7 or 8 of the light conductor segment unit 5 so that the electron beam 12, which is controlled by the red color signal received by the television receiving set, will only light up the red fluorescent color ribbon 6 in each of the many light conductor units 5 of the multiple plastic rod picture screen by its scanning action. Likewise, electron beams 13 and 14 only light up the blue and green fluorescent ribbons 7 and 8 respectively in each of the light conductor units 5 of the complete color screen 10. In Figure 4 the three different color lighting phosphors 2, 3 and 4 are shown coated to the back side of the clear transparent horizontal plastic segment strip 9. An alternate method of producing the three different color ribbons 6, 7 and 8 is shown in Figure 5 where a segment strip 9 is shown having three separate color filters made of colored plastic ribbons placed against the edge of the clear plastic segment strip 9 and having a coating of white light producing phosphors 15 which produces the lighting for the segment. When the electron beam is scanning the phosphors coated to the red plastic ribbon 6 the light thus produced shines through the red plastic filter ribbon 6 and through the clear plastic segment light conductor unit 5 producing a red light that is seen over the entire surface 1 of the rectangular light conductor unit 5 thus forming a red rectangular dot which makes up a tiny portion of the picture image of the television viewing screen 1 which may have a translucent coating, if desired, for better picture reproduction. The purpose of the rectangular plastic light conductor rod 5 is to form a color blending or mixing chamber so that any combination of the red, green and blue lights produced by the ribbons 6, 7 and 8 will blend together within the plastic segment rod 5 and form the desired color on the surface 1 of the viewing screen 10. This blending is accomplished due to the peculiar action of certain transparent plastics which reflect light inwardly from their surfaces thus preventing the colored light produced on the ribbons 6, 7 and 8 from passing outwardly from one light conductor unit 5 to another unit 5. Instead the colored lights are contained entirely within each unit 5 and only leave the unit 5 at the viewing end 1 of the unit forming the viewing screen of the television picture tube. As these colored lights are reflected back and forth inwardly from the sides of the light conductor units 5 the various colors are thus blended and form the desired color on the viewing screen.

This multiple plastic rod color blending picture screen for color television reception is particularly adaptable to the large sized picture tube sets. For operation with a sequential color transmission picture signal the electron beam is reduced or focused down to approximately one-third the width of the horizontal screen segment 9 of the multi-segment color screen as described. This permits the electron beam to scan only one of the three separate color ribbons 6, 7 and 8 at any particular instant. The deflecting voltages which control the horizontal and vertical scanning sweeps of the electron beam are designed and adjusted so that each horizontal sweep of the electron beam for any one picture scanning will only light up the particular color ribbon corresponding to the color signal which is then controlling the electron beam. In this way we have first a scanning of the horizontal red color ribbon of each segment being scanned, then a scanning of the electron beam on the blue horizontal color ribbon of each segment being scanned and finally a third scanning of the electron beam on the green horizontal color ribbons, thus giving the effect on the human eye of the television picture being shown in its natural color, due to proper blending of the colors within the light conductor units 5 of the horizontal segment strips 9 which make up the entire surface of the viewing screen 1.

For operation with a sequential color transmission picture signal system either a single-cathode or a three-cathode picture tube may be used. When a single cathode tube is used the single electron beam is controlled in sequence by first the red signal, then the blue signal and finally by the green signal, so that there is first a scanning of the red ribbons of the odd numbered segments, then a scanning of the blue ribbons of the odd numbered segments and finally a scanning of the green ribbons of the odd numbered segments. This is followed by the scanning of the electron beam on the red, then the blue and then the green ribbons of each of the even numbered segments thus forming a complete scanning of one color picture frame. Since each segment is the thickness of a scanning line of the ordinary black and white picture tube each picture line or full segment strip will be seen in its proper color by the rapid succession combination of the three colors produced by the scanning of the three color ribbons 6, 7 and 8. The three colors shine in rapid succession in sequence, and continue to shine for a short period after the scanning beam has passed, through the clear plastic color blending rod 5 to form the desired color combination on the front of the segment surface or viewing screen 1.

When a three-cathode picture tube is used for sequential color reception each color ribbon of each segment is scanned the same as before although in this case there are three electron beams instead of only one. One beam 12 is directed to scan only the red color ribbons, the beam 13 scans only the blue ribbons and the beam 14 scans only the green color ribbons of each segment of the viewing screen 1. In this way the deflecting coils 16 of the picture tube control all three electron beams simultaneously just as though all three beams were really only one larger beam divided into three color divisions and each beam scans only the color ribbons assigned to it and does not have to be controlled to scan a different color ribbon each time it scans the picture screen as is the case when a single cathode picture tube is used with this multi-segment color screen. It should be noted, however, that only one electron beam is in operation at any one time with sequential color transmission, so that when the red signal beam is scanning the color filter the blue and green signals are blacked out. Since the three color signal scanning beams follow each other in rapid the clear segment strip 9 any color or combination of color blended within the color blending rods 5 and are seen on the viewing screen 1 as the desired color units for the colored picture image being received. Also, since the phosphors emit light for some time after the scanning beam has passed by, the light from all three color ribbons may be shining through the clear plastic color blending rod 5 at the same time. This is essentially the same as if all three color signals were received at the same instant as with simultaneous color reception and produces the desired color combinations on the picture viewing screen 1.

For operation with simultaneous color signal transmission the three-cathode picture tube is used. As can be seen in Figure 2 the three cathodes or electron guns 18 each send an electron beam across the tube to the phosphorescent material 15. Since each beam is controlled by deflecting coils energized by the same horizontal and vertical sweep control voltages the three electron beams 12, 13 and 14 sweep across the face of the tube in unison with each other and synchronized with the electron beam at the transmitter camera. By proper adjustment of the separate deflection voltages to these deflecting coils the three electron beams may be controlled so that one beam will scan only the red portion of each segment strip 9, another electron beam will scan the blue portion or ribbon of each segment and the third beam will scan the green ribbon of each segment.

In simultaneous color reception as described above all three electron beams are scanning their proper color ribbons at the same time, thus producing the proper color strength and color combination for each light conductor unit 5 of each horizontal segment 9 of the multiple rod color screen 10. When there is more than one beam scanning the color ribbons of one particular plastic rod of the color screen the two or more colors thus produced by the phosphorescent material and color ribbons shine through the clear plastic rod 5 and are blended or combined within each color unit 5 and segment strip 9 to produce on the viewing surface 1 of the viewing screen the desired color for that particular portion of the picture being televised at the transmitter camera. When all three colors are properly blended within each rod of the clear segment strip 9 any color or combination of color or a black and white picture may be shown on the viewing screen as may be desired to show the exact color or color combination of the object being televised at the transmitter camera. The front surface of the clear plastic segment strip 9 may be either a clear polished surface or a translucent coating may be applied for better picture reproduction if desired.

As shown if Figure 2 the complete color blending screen may be constructed so that it has a curved surface on the phosphorescent color side and a flat surface on the outer or viewing screen side, thus eliminating optical distortion from screen curvature.

During manufacture of the colored plastics for the filter ribbons 6, 7 and 8 of Figure 5, a colored fluorescent dye may be mixed with the clear transparent plastic material to produce a more brilliant colored picture on the viewing screen. The white light produced by the electron beam striking the white phosphors 15, shines through the colored ribbons 6, 7 and 8 and the fluorescent material is activated by this light to produce a brighter color on the viewing screen 1 than would be produced by the light from phosphors 15 shining through ordinary transparent colored plastics due to their low efficiency of light conductivity.

Having thus described my invention, I claim:

1. A cathode ray tube for color television having a picture screen in one end thereof, said screen structure comprising: a plurality of parallel, horizontal, rectangular, clear transparent plastic rods arranged side by side in rows both vertically and horizontally, each said plastic rod, due to the internal reflection of light from its polished sides, being a small color blending, light conductor unit; a coating of a plurality of different color light producing phosphors attached in horizontal ribbons to one end of each said plastic rod, the other end of each said rod being a small part of the color picture viewing side of the picture screen, the colored light producing phosphor coated ends of the plastic rods adapted to be scanned on their horizontal phosphor ribbons by an electron beam from the electron gun of the cathode ray picture tube.

2. A picture screen structure for color television comprising many parallel, rectangular shaped, horizontal rods of clear transparent plastic arranged side by side, both vertically and horizontally, in rows, each said rod having three horizontal ribbons of different colored light producing phosphors, arranged side by side vertically, coated to one end of the said plastic rod and forming a colored light blending chamber within the said plastic rod when said phosphors emit their colored lights, due to the action of the electron beam of the cathode ray television picture tube, the other end of each said plastic rod coated with a translucent material for diffusing the colored lights blended within the plastic rod due to the internal light reflection from all four sides of the said plastic rod; the translucent end of each said plastic rod forming a single tiny rectangular shaped color picture unit of the entire color picture viewing screen located within the viewing end of the cathode ray television picture tube.

3. A cathode ray picture tube for color television containing three cathodes and three electron beams with their controlling apparatus, a viewing screen composed of the ends of many parallel, rectangular shaped, clear transparent plastic rods arranged side by side both vertically and horizontally, each said rectangular rod having three horizontal ribbons of different color producing phosphors coated to one end, the other end of each said rod having a coating of translucent material to diffuse the colored lights emitted from the colored phosphors and blended within the plastic rod so as to appear upon the translucent coated screen as the properly blended color desired, the end of each said plastic rod being a single, tiny rectangular color picture unit, a tiny portion of the entire picture viewing screen located within the viewing end of the cathode ray television picture tube.

4. A viewing screen for color television composed of many horizontal strips of clear transparent plastic arranged side by side vertically, each said horizontal plastic strip being almost wholly divided by many vertical slots to form numerous parallel rectangular plastic rods, arranged in rows both vertically and horizontally, each said plastic rod itself forming a colored light blending chamber, blending the different colored lights emitted from three ribbons of different colored light producing phosphors that are coated to one end of each said rectangular plastic rod, the other end of each said rod being coated with a translucent material to diffuse the blended colors, the translucent end of each said rod itself being a tiny rectangular picture unit which, together with all of the other rod ends, make up the entire picture viewing screen located within the viewing end of the color television cathode ray picture tube.

5. A picture screen structure for color television composed of many horizontal strips of clear transparent plastic arranged side by side vertically, each horizontal plastic strip divided horizontally by many vertical slots to form numerous plastic rods arranged in rows both vertically and horizontally, each plastic rod having three horizontal ribbons of different colored light producing phosphors arranged side by side vertically coated to one end of each rod, the entire picture screen being located inside a cathode-ray television picture tube with the clear transparent plastic surface forming the viewing screen of the picture tube.

6. A cathode-ray picture tube for color television reception containing three cathodes and three electron beams with their controlling apparatus, a viewing screen constructed of many horizontal segments of clear plastic arranged side by side vertically, each segment divided horizontally by many vertical slots to form numerous plastic light conducting and blending units arranged in rows both vertically and horizontally, each light conducting unit having a plurality of horizontal ribbons of different colored light producing phosphors coated to one end, the other end having a translucent coating and forming a tiny part of the viewing screen of the picture tube.

7. A cathode-ray picture tube for color television reception containing a plurality of cathodes and electron beams with their controlling apparatus, a laminated plastic picture screen composed of many horizontal strips of clear plastic arranged side by side vertically, each horizontal strip being divided horizontally by many vertical slots to form numerous plastic transparent light conductor units, a coating of a plurality of horizontal ribbons of different colored light producing phosphors attached to one end of each transparent light conductor unit, each unit having light reflecting sides which by internal reflection of the colored lights cause a blending action of the colored lights upon the other end of each transparent light conductor unit, forming a tiny portion of the viewing screen of the color picture tube.

8. A picture screen structure for color television comprising many parallel, rectangular shaped, horizontal rods of clear transparent plastic arranged side by side, both vertically and horizontally, in rows, each said rod having three horizontal ribbons of different colored light producing phosphors arranged side by side vertically, coated to one end of the said plastic rod and forming a colored light blending chamber within the said plastic rod when said phosphors emit their colored lights, due to the action of the electron beam of the cathode-ray tube, the other end of each said plastic rod forming a single tiny rectangular shaped color picture unit of the entire color picture viewing screen located within the viewing end of the cathode-ray television picture tube.

References Cited in the file of this patent

UNITED STATES PATENTS

| | | |
|---|---|---|
| 2,310,863 | Leverenz | Feb. 9, 1943 |
| 2,446,440 | Swedlund | Aug. 3, 1948 |
| 2,459,694 | Gordon | Jan. 18, 1949 |
| 2,480,848 | Geer | Sept. 6, 1949 |
| 2,532,511 | Okolicsanyi | Dec. 5, 1950 |
| 2,543,477 | Sziklai et al. | Feb. 27, 1951 |
| 2,561,508 | Gregorie et al. | July 24, 1951 |
| 2,577,038 | Rose | Dec. 4, 1951 |
| 2,586,723 | Sokals | Feb. 19, 1952 |
| 2,599,739 | Barnes | June 10, 1952 |
| 2,605,349 | Homrighous | July 29, 1952 |
| 2,605,434 | Homrighous | July 29, 1952 |
| 2,622,220 | Geer | Dec. 16, 1952 |
| 2,660,684 | Parker | Nov. 24, 1953 |